May 5, 1964 H. DEUTSCHMEISTER 3,131,854

MULTIPLE INTELLIGENCE TRANSMISSION MEANS

Filed July 12, 1961 2 Sheets-Sheet 1

INVENTOR.
HERMAN DEUTSCHMEISTER

BY Norbert P. Holler

ATTORNEY

MULTIPLE INTELLIGENCE TRANSMISSION MEANS

Filed July 12, 1961

2 Sheets-Sheet 2

INVENTOR.
HERMAN DEUTSCHMEISTER
BY Norbert P. Holler
ATTORNEY

United States Patent Office 3,131,854
Patented May 5, 1964

3,131,854

MULTIPLE INTELLIGENCE TRANSMISSION MEANS

Herman Deutschmeister, 875 West End Ave., New York 25, N.Y.

Filed July 12, 1961, Ser. No. 123,587
5 Claims. (Cl. 229—73)

This invention relates to the transmission of information, data and requests for related intelligence by mail, and in particular to multiple mailing envelopes or like constructions designed for this purpose.

It is an object of the present invention to provide means adapted for the transmission of information and intelligence of diverse types from a source to one or more recipients and for the further transmission of the same or related items by the recipients either directly or indirectly back to the said source.

Another object of the present invention is the provision of multiple mailing envelopes by means of which a sender can transmit one or more messages, e.g. advertising, solicitation of funds or contribuitons, statistical data and the like, statements of payments due, etc., to intended recipients of such messages, who may then employ the same envelopes for sending back to the original sender the indicated responses.

A further object of the present invention is the provision of such envelopes by means of which a first recipient thereof can forward the received envelope, with his own response enclosed therein, to a further recipient, and so on, until the last recipient employs the same envelope to return it with its totality of enclosed messages to the original sender.

The foregoing and other objects of the present invention, as well as the characteristics and advantages of preferred embodiments thereof, will be more clearly comprehended from the following detailed description when read with reference to the accompanying drawings, in which:

FIG. 6 is a pocket-side view of the envelope as it appears before the recipient thereof inserts his reply and mails it back to the original sender;

Figure 1:
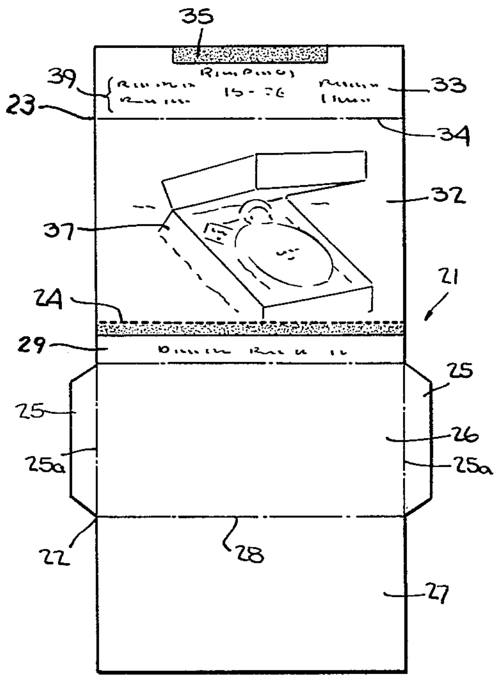
FIG. 1 is a plan view of a dual mailing envelope blank according to the present invention.
Figure 2:
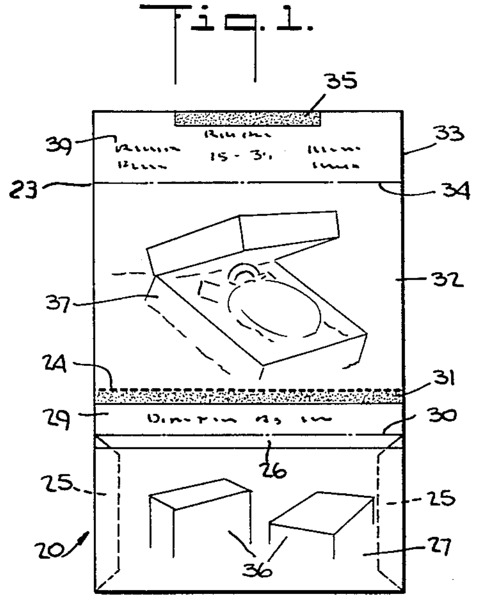
FIG. 2 is a pocket-side view of the original envelope formed from the blank of FIG. 1.
Figure 3:
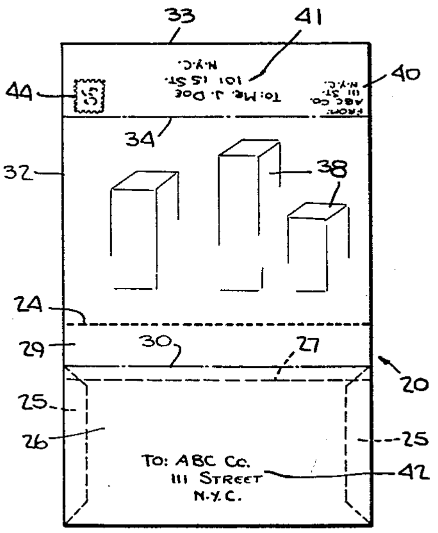
FIG. 3 is a reverse view of the envelope shown in FIG. 2.

Referring first to FIGS. 1, 2 and 3, the envelope 20 according to this embodiment of the invention is formed from a blank 21 composed of paper or like sheet material. As shown in FIG. 1, the blank 21 has a pocket-forming section 22 and a cover flap-forming section 23 which are joined to one another along a transverse line of perforations 24. The pocket-forming section 22 is provided at its opposite sides with a pair of flaps 25 which project from a median portion or panel 26 of the said section. One of the surfaces of each of these flaps, in FIG. 1 the undersurface which is not visible, is coated with a layer of gum or adhesive.

The blank 21 is readied for use by folding the flaps 25 along a pair of fold lines 25*a* over against the portion 26 of the section 22 of the blank so that their gummed surfaces are uppermost, and by then folding a portion or panel 27 of the said section 22 along a fold line 28 so as to overlie the flaps 25, the marginal side regions of the folded-over panel 27 being attached to the flaps 25 with the aid of the adhesive or gum provided on the latter, thereby to form a pocket into which a message or other information-bearing paper may be put as will presently be more fully described. Alternatively, of course, the required adhesive may be provided on the inner face of the panel 27 itself rather than on the flaps 25. It would also be possible to provide the adhesive on the other faces of the flaps 25, i.e. on the top faces thereof shown in FIG. 1, or on the outer face of the panel 27, in which case the pocket would be formed by first folding over the panel 27 and then the flaps 25, to position the latter exteriorly of the pocket.

The pocket-forming section 22 of the blank 21 further includes a relatively narrow panel 29 attached at one edge to the panel 26 along a fold line 30 and provided at its opposite edge with a layer 31 of adhesive or gum. The cover flap-forming section 23 comprises a main panel 32 the junction of which with the panel 29 is defined by the perforations 24. A second panel 33, much narrower than the panel 32, is attached to the latter along a fold line 34 and is provided at its free edge region with a layer 35 of adhesive or gum. As is clearly apparent from the drawings, the width of the panel 32 measured from the line of perforations 24 to the fold line 34 is somewhat greater than the combined width of the panels 26 and 29, while the width of the panel 26 is somewhat greater than that of the panel 27. It is from the combination of the panels 32 and 33 and from their dimensional relationships to the remainder of the envelope that the principal advantages of the present invention and the almost unlimited versatility of the envelopes disclosed herein stem, as will appear more clearly from the following.

One use to which the envelope 20 of FIGS. 1 to 7 is particularly well suited is an advertising campaign by a department store, mail order house, or like organization. To this end, there are applied, by printing or in any other suitable manner, to the outer face of the pocket-forming panel 27, to the opposite faces of the main cover flap-forming panel 32, and to the inner face of the second cover flap-forming panel 33 a plurality of advertising messages 36, 37, 38 and 39, respectively, which show with pictures and words (see FIGS. 1 to 3 and 6) the various products, together with their prices, available for purchase at the sender's store or office. At the same time, the outer face of the flap panel 33 sets forth in the upper left-hand corner thereof, as shown at 40, the name and address of the sender, and in the center thereof, as shown at 41, the name and address of the intended recipient of the various advertising messages, while the outer face of the panel 26 sets forth at 42 in the center of the lower region thereof, i.e. that region which is lowest when the envelope is held so that the fold line 28 constitutes the bottom end of the envelope, the name and address of the original sender. The perpendicular distance from the so-defined bottom edge of the panel 26 to the top of the first line of the writing 42 is less than the width of the panel 33 as measured out from the fold line 34, for a purpose soon to be explained.

Figure 4:
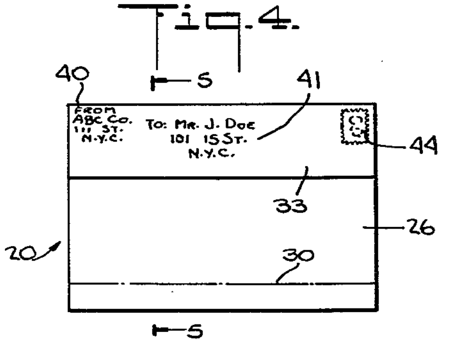
FIG. 4 is a front view of the envelope of FIGS. 2 and 3 as it appears when closed and during the outgoing transmission thereof by the original sender.
Figure 5:
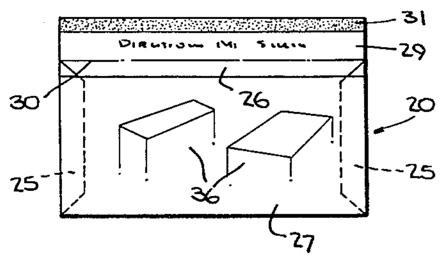
FIG. 5 is a sectional view taken along the line 5—5 in FIG. 4.

The advertiser, when preparing a mail campaign, inserts one or more order blanks 43 (see FIG. 5) into the pocket formed by the panels 26 and 27, and if desired also some additional advertising literature, thereafter first folds the flap-forming panel 32 along the line of perforations 24 over against the panel 27 so as to cover the open top end of the pocket, then folds the panel 33 along the fold line 34 over against the outer face of the panel 26, and finally seals the entire structure with the aid of the adhesive 25. The closed envelope thus looks as shown in FIG. 4, from which it will also be noticed that the panel 33 completely covers the writing 42, i.e. the address of the sender on the panel 26. Following application of the proper amount of postage, by stamps, meter or permit, to the envelope at the upper right-hand corner of the panel 33, as shown at 44, the envelope is mailed. An important aspect of the present invention, therefore, is the fact that the sender need not enclose the envelope in another outer envelope as has heretofore generally been necessary in mail advertising campaigns.

When the envelope 20 is received by the named addressee, the latter opens it by pulling the adhered portion of the panel 33 away from the panel 26. To permit this to be done easily, the gum or adhesive 35 is of such a composition that it enables the panel 33 to be lifted without tearing or marring the paper of which the envelope is made. As shown in FIGS. 1 and 2, the adhesive layer 35 need not extend over the full length of the panel 33, but it may be in the form of a plurality of shorter strips spaced from one another (not shown) along the outermost edge of the panel 33.

Figure 7:
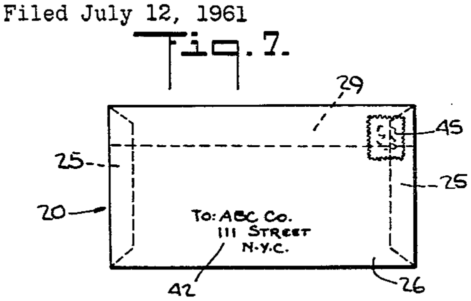
FIG. 7 is a front view of the envelope of FIG. 6 when closed and during the return transmission thereof.

Should the recipient of the envelope 20 be desirous of ordering some of the merchandise advertised, he detaches the two-part panel 32—33 directly from the pocket part of the envelope along the line of perforations 24, in accordance with instructions which are set forth on the inner face of the panel 29 between the fold line 30 and the perforations 24, at which time the envelope looks as shown in FIG. 6. He also fills out the order blank, replaces it in the envelope pocket, if desired together with a check or money order, and then folds the panel 29 over against the panel 27 along the fold line 30, sealing the two panels to one another with the aid of the adhesive 31. The envelope thus looks as shown in FIG. 7 and may be mailed back to the original sender without further ado, other than the placing of postage 45 onto the panel 26 at the upper right-hand corner thereof, since the original sender's name and address, set forth at 42 and previously covered by the panel 33, are now fully visible. This illustrates a further advantageous aspect of the present invention, to wit that only one printing or envelope preparation is necessary for two separate and distinct mailings, while the recipient of the envelope by the first mailing is immediately in the position of being able to effect the second mailing of the same envelope without the burden of having to address the same or even of writing his own return address.

Other uses of the so far described envelope construction will readily suggest themselves to those skilled in the art. Thus, the envelope 20 may be employed by charitable or non-profit relief and public assistance organizations, homes for sick, elderly and orphaned persons, or the various medical and health research foundations, for the solicitation of contributions and funds, by contest-running organizations, by companies involved in the accumulation of public opinion data or in the collection of outstanding debts, premiums or other payments, etc. It may also readily be used by a prospective employer in requesting references from previous employers or other acquaintances of an applicant for a position, but in such event the panels 32 of the various envelopes sent out would be the items returned in these envelopes by the respective recipients thereof. In any given case, therefore, the messages 36, 37, 38 and 39 (which need not necessarily be advertisements) will be tailored to the activities and purposes of the particular organization which has caused the envelopes 20 to be sent out.

Figure 8:
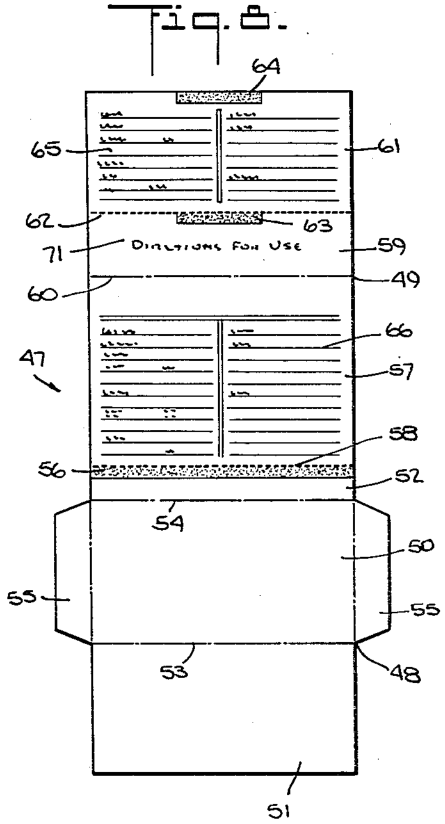
FIG. 8 is a plan view of a three-way mailing envelope blank according to a modification of the present invention.
Figure 9:
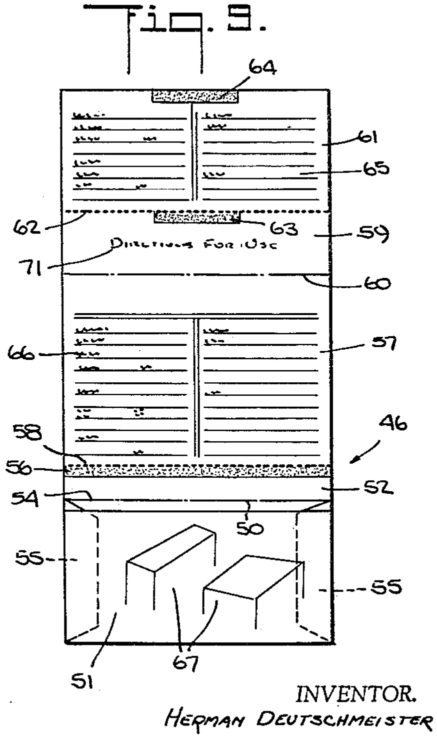
FIG. 9 is a pocket-side view of the envelope formed from the blank of FIG. 8 before it is mailed to the first recipient thereof.

The envelope construction as outlined hereinabove is capable of being modified somewhat for use in multiple mailings, i.e. for transmission from the original sender to more than one recipient prior to the return of the envelope to the original sender. This construction is illustrated for a three-way mailing envelope in FIGS. 8 to 11. As shown in FIGS. 8 and 9, the envelope 46 is made from a blank 47 having a pocket-forming section 48 and a cover flap-forming section 49. The pocket-forming section 48 includes three adjacent panels 50, 51 and 52, a fold line 53 establishing the boundary between the panels 50 and 51, and a fold line 54 establishing the boundary between the panels 50 and 52. Side flaps 55, preferably gummed on one surface thereof, extend from the panel 50. The panel 52, which is much narrower than the panels 50 and 51, is provided at its edge remote from the fold line 54 with a layer 56 of gum or adhesive. The pocket-forming section 48 of the blank 47 is, therefore, seen to be identical with the pocket-forming section 22 of the blank 21 shown in FIG. 1.

The cover flap-forming section 49 of the blank 47 includes a first panel 57 joined at one edge to the gummed edge of the panel 52 by a line of perforations 58 and at the opposite edge to a second panel 59 by a fold line 60. A third panel 61 is joined to the panel 59 by a line of perforations 62. The panel 59 is provided with a layer 63 of quick-releasing adhesive or gum adjacent the perforations 62, while the panel 61 is provided with a similar adhesive layer 64 adjacent its free edge. The width of the panel 57, as measured between the fold line 60 and the line of perforations 58, is a little greater than the combined width of the pocket-forming panels 50 and 52, and the panels 59 and 61 are so dimensioned that their combined width is substantially equal to that of the panel 57. Thus it will be seen that the panels 57 and 59 are identical with the panels 32 and 33, respectively, of the envelope shown in FIGS. 1 to 7 in terms of function as well as in terms of relative size, whereby the envelope of FIGS. 8 to 11 may be considered as consisting of the envelope of FIGS. 1 to 7 with an extra panel attached to the outermost edge of the panel 33.

One use for which the envelope 46 of FIGS. 8 to 11 is particularly well suited is the obtaining of information from a plurality of sources, for example in the checking of character references of an applicant for a position by the prospective employer. To this end, there are provided on the inner faces of the panels 61 and 57 respective messages 65 and 66 which are addressed to the respective appropriate parties, say former employers of the applicant, and include requests for information and also empty spaces to permit the respective addressees to place their replies directly on the same panels. If desired, the outer face of the panel 51 may carry an advertising message 67 or the like.

Figure 10:
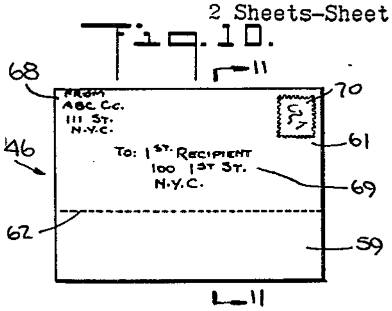
FIG. 10 is a front view of the envelope of FIG. 9 as it appears during the first transmission thereof.
Figure 5:
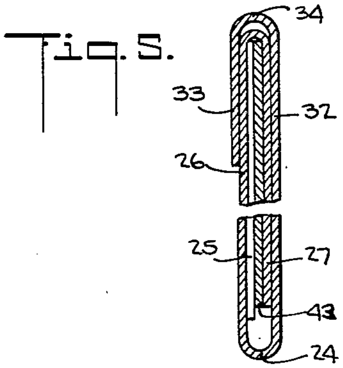
Figure 11:
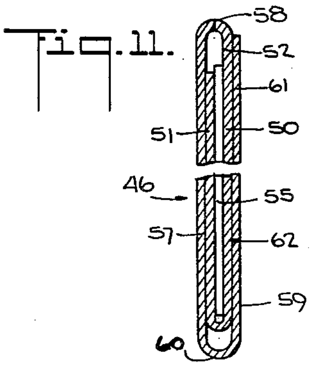
FIG. 11 is a sectional view taken along the line 11—11 in FIG. 10.

In use, the original sender folds the panel 57 along the line of perforations 58 over the pocket and against the panel 51 and then folds the combination panel 59—61 along the fold line 60 over against the combination panel 50—52, sealing the envelope by attaching the outermost region of the panel 61 to the outermost region of the panel 52 with the aid of the layer of gum 64. The envelope 46 now looks as shown in FIGS. 10 and 11, the outer face of the panel 61 bearing in its upper left-hand corner, as shown at 68, the return address of the original sender, in its lower central region, as shown at 69, the name and address of the first recipient of the envelope, and in its upper right-hand corner, as shown at 70, the required amount of postage. Although not shown in FIGS. 8 to 11, the outer face of the panel 50 bears the name and address of the original sender in the same manner and location as shown at 42 on the panel 26 of the envelope 20 of FIGS. 1 to 7.

When the first recipient receives the envelope 46, he opens the same by pulling the free edge of the panel 61 away from the panel 52, the characteristics of the gum or adhesive 64 ensuring that the paper of which the envelope is made will not tear or be marred by this operation. Having filled in the proper data or information in the spaces of the message 65 on the panel 61, the first recipient detaches the said panel from the envelope at the perforations 62, whereupon the envelope 46 looks exactly like the envelope 20 shown in FIGS. 2 and 3, and places the detached panel 61 into the pocket of the envelope, in accordance with instructions provided on the inner face of the panel 59, as shown at 71. Thereafter, he again folds the panel 57 over against the panel 51 and then folds the panel 59 along the fold line 60 over against the panel 50, thus covering the address 42 on the latter. Onto the outer face of the panel 59, the first recipient then places the name and address of the second recipient (taken from the message 66 on the inner face of the panel 57) and applies the necessary postage, as shown in FIG. 4 at 41 and 44 on the panel 33 of the envelope 20. When the panel 59 is then sealed to the outer face of the panel 50 with the aid of the gum or adhesive 63, the envelope 46 looks exactly like the envelope 20 shown in FIG. 4.

The second recipient of the envelope 46, upon receiving the latter, opens it at the panel 59 and fills in the requested information or data on the panel 57 and, having discarded the panel 59 and detached the panel 57 from the panel 52 at the perforations 58, at which time the envelope 46 looks like the envelope 20 shown in FIG. 6, encloses the panel 57 in the pocket of the envelope 46 and seals the latter by folding the gummed panel 52 along the fold line 54 over against the panel 51. With sufficient postage applied to the upper right-hand corner of the panel 50, therefore, the envelope 46 now looks like the envelope 20 shown in FIG. 7 and may be mailed by the second recipient without further ado directly back to the original sender. As a consequence of this manner of use of the three-way envelope 46, the prospective employer may obtain a plurality of character references at the cost of only one envelope and one postage, as distinguished from the use of the dual envelope 20 which requires a separate envelope under separate postage to be sent out for each such reference.

It will be understood, of course, that the envelope 46 is suited for other types of information and data gathering purposes than the one just described, as set forth hereinbefore in connection with the envelope 20. Moreover, although the various detachable envelope panels have been disclosed as bearing messages of one kind or another, they may just as well serve as coupons or trading stamps, prize certificates, labels, etc., and the term "messages" is to be interpreted in this more expanded sense rather than merely to designate communication of ideas. Where desired, it is also possible to provide windows at suitable locations in the pocket-forming panels to enable addresses to be seen therethrough. The basic principle of the present invention, i.e. the provision of the full-width panel 32 (or 57) in conjunction with the attached narrower panel 33 (or 59) with or without the extra panel 61, is still further applicable to a folder-type envelope construction in which the lateral flaps 25 (or 55) may be much larger than shown and not adhered to the adjacent pocket-forming panel 27 (or 51), or in which the said lateral flaps are omitted entirely.

As can be readily seen, therefore, it is the presence and width of the relatively narrow fifth panel 33 (or 59) in cooperation with the location of the address 42, i.e. the distance between the top of the latter and the bottom edge 28 (or 53) of the envelope, which imparts to the envelopes 20 and 46 an almost unlimited versatility and which enables the hereinbefore stated objects and advantages of the present invention to be attained without any economic disadvantages to the original senders or the recipients of the envelopes. Regardless of whether the particular intelligence transmission is a two-way operation or one involving three or more parties, none of them is ever required to incur a greater expense than one mailing charge, irrespective of whether he mails the received envelope back to the original sender or forwards it to another intended recipient, and none of them is required to go to the expense of enclosing his reply intelligence in a separate envelope not supplied by the original sender.

While there have been described herein preferred embodiments of the present invention, it is nevertheless deemed apparent that the structures and structural relationships disclosed are capable of being modified and extended in a number of ways none of which involves any departure from the spirit and scope of the present invention and all of which are embraced by the claims appended hereto.

Having thus described my invention, what I claim and desire to secure by Letters Patent is:

1. A three-way mailing envelope, comprising a sheet of paper divided into six contiguous panels, the first and second panels being folded over against one another to define a pocket, said second panel bearing the name and address of the original sender on its outer surface in the lower central region thereof, the third and fourth panels bounding on one another along a first line of perforations, the fifth and sixth panels bounding on one another along a second line of perforations, said fourth panel as measured from its boundary with said fifth panel to said first line of perforations being wider than said second and third panels combined as measured from said first line of perforations to the boundary of said second panel with said first panel, said fifth panel being narrower than said second panel, the distance from the top of the said name and address of the original sender on said second panel to the bottom edge of the envelope defined by the boundary between said first and second panels being less than the width of said fifth panel as measured between its boundary with said fourth panel and said second line of perforations, whereby said fifth panel, when folded over against said second panel, covers the said name and address of the original sender, said fifth and sixth panels as measured from the free end edge of the latter to the boundary of said fifth panel with said fourth panel being of substantially the same width as said fourth panel, said sixth panel bearing in one corner of its outer surface the original sender's return address and in the central region of its outer surface the name and address of the first intended recipient and being adapted for the application of postage in another corner of its outer surface, said fifth panel being adapted to bear in one corner of its outer surface the original sender's return address and in the central region of its outer surface the name and address of the second intended recipient and being adapted for the application of postage in another corner of its outer surface, and the inner surfaces of said sixth panel adjacent said free end edge thereof, of said fifth panel adjacent said second line of perforations, and of said third panel adjacent said first line of perforations being gummed to permit sealing of the envelope during the respective transmissions thereof from the original sender to the first recipient, from the latter to the second recipient, and from the second recipient back to the original sender.

2. A three-way mailing envelope according to claim 1, further comprising a pair of side flaps extending from said second panel and folded over against the latter and said first panel, said flaps being adhesively secured to said first panel so as to leave said pocket open only at its top adjacent the boundary of said second panel with said third panel.

3. Means for multiple mail transmission of intelligence, comprising an envelope having first and second panels attached to each other along a first fold line and folded over against one another to define a pocket, said second panel bearing the name and address of the original sender on its outer surface in the lower central region thereof, a third panel attached to said second panel along a second fold line, a fourth panel attached to said third panel along a first line of perforations, a fifth panel attached to said fourth panel along a third fold line, said fourth panel as measured from said first line of perforations to said third fold line being wider than said second and third panels combined as measured from said first fold line to said first line of perforations, said fifth panel being narrower than said second panel, the distance from the top of the said name and address of the original sender on said second panel to the bottom edge of the envelope defined by said first fold line being less than the width of said fifth panel as measured outwardly from said third fold line, whereby said fifth panel, when folded over against said second panel, covers the said name and address of the original sender, and a sixth panel attached to said fifth panel along a second line of perforations, the combined width of said fifth and sixth panels as measured from said third fold line to the free end edge of said sixth panel being substantially equal to the width of said fourth panel, said sixth panel bearing in one corner of its outer surface the original sender's return address and in the central region of its outer surface the name and address of the first intended recipient and being adapted for the application of postage in another corner of its outer surface, said fifth panel being adapted to bear in one corner of its outer surface the original sender's return address and in the central region of its outer surface the name and address of the second intended recipient and being further adapted for the application of postage in another corner of its outer surface, said sixth panel being gummed on its inner surface adjacent said free end edge thereof to permit sealing of the envelope during the first transmission thereof by the original sender to said first recipient, said fifth panel being gummed on its inner surface adjacent said second line of perforations to permit sealing of the envelope subsequent to the detaching of said sixth panel and during the second transmission from said first recipient to said second recipient, said third panel being gummed on its inner surface adjacent said first line of perforations to permit sealing of the envelope subsequent to the detaching of said fourth and fifth panels and during the third transmission from said second recipient to the original sender, and at least some of said first, third, fourth, fifth and sixth panels bearing on at least one of the respective surfaces thereof messages or other intelligence for use by said recipients preparatory to the return transmission of their reply intelligence to the original sender.

4. Multiple mail transmission means according to claim 3, the composition of the gum on said inner surfaces of said third, fifth and sixth panels being such that each of said third, fifth and sixth panels can be pulled away from the surface of any other panel of the envelope to which it is sealed without tearing and marring the paper of which the envelope is made.

5. Multiple mail transmission means according to claim 4, said envelope further having a pair of side flaps extending from said second panel and folded over against the latter and said first panel, said flaps being adhesively secured to said first panel so as to leave said pocket open only at its top adjacent said second fold line.

References Cited in the file of this patent

UNITED STATES PATENTS

| | | |
|---|---|---|
| 1,957,704 | Drachman | May 8, 1934 |
| 2,402,821 | Kosteling | June 25, 1946 |
| 2,759,658 | Sawdon | Aug. 21, 1956 |
| 2,846,135 | Hiersteiner | Aug. 5, 1958 |
| 2,928,583 | Law | Mar. 15, 1960 |